United States Patent [19]

Walters

[11] 4,380,280
[45] Apr. 19, 1983

[54] CAM OPERATED FRICTION CLUTCH

[76] Inventor: John D. Walters, Rte. 1, Box 244H, New Orleans, La. 70129

[21] Appl. No.: 107

[22] Filed: Jan. 2, 1979

[51] Int. Cl.³ .................... F16D 13/14; F16D 13/75
[52] U.S. Cl. ................................. 192/78; 192/75; 192/93 C; 192/111A
[58] Field of Search .................. 192/75, 76, 78, 93 R, 192/93 C, 99 B, 111 A; 188/334, 330, 336

[56] References Cited

U.S. PATENT DOCUMENTS

| | | | |
|---|---|---|---|
| 161,119 | 3/1875 | Harrington | 192/76 |
| 701,953 | 6/1902 | Smith | 192/105 CE |
| 841,520 | 1/1907 | Herisson | 192/76 |
| 1,153,853 | 9/1915 | Pfeiffer | 192/75 |
| 1,159,717 | 11/1915 | Scott | 192/78 |
| 1,167,117 | 1/1916 | Sandford | 192/75 |
| 1,509,511 | 9/1924 | Hoerl | 192/75 |
| 1,594,105 | 7/1926 | Miller | 192/75 |
| 1,910,352 | 5/1933 | Moyer | 192/105 BA |
| 2,277,659 | 3/1942 | Bokich | 192/78 |
| 2,301,849 | 11/1942 | Bialy | 192/105 CD |
| 2,481,084 | 9/1949 | Claire | 192/75 |
| 2,869,684 | 1/1959 | Tarbuck | 192/75 X |
| 2,942,711 | 6/1960 | Zindler | 192/105 BA |
| 3,224,541 | 12/1965 | Yamamoto | 192/105 CD |
| 3,565,222 | 2/1971 | Kimoto | 192/76 X |
| 3,724,622 | 4/1973 | Barbulesco et al. | 192/105 CE |

Primary Examiner—Rodney H. Bonck

[57] ABSTRACT

The present invention provides an externally engagable clutch which comprises an inner rotating hub member operably attached to a rotating back plate upon which is pivotly mounted an eccentric arm and a circular shaped clutch assembly provided with a clutch lining. An outer rotating clutch drum hub is provided which is rotatably attached to and in alignment with the inner rotating hub. Clutch drum hub eccentric cam means are mounted on the outer peripheral surface of the outer drum hub. Cam follower means is rotatably mounted upon the eccentric arm in constant rolling contact with a cam surface. As the cam follower means is displaced over the peripheral surface of the cam the eccentric arm is caused to shove the clutch assembly outwards into frictional contact with the clutch drum thereby connecting the driving source with the driven member. A throw out lever assembly is rotatably mounted upon the outer portion of the outer rotating clutch drum hub for laterally displacing the cam or cam follower.

A preferred embodiment is directed to displacing the cam follower rather than the cam faces.

10 Claims, 11 Drawing Figures

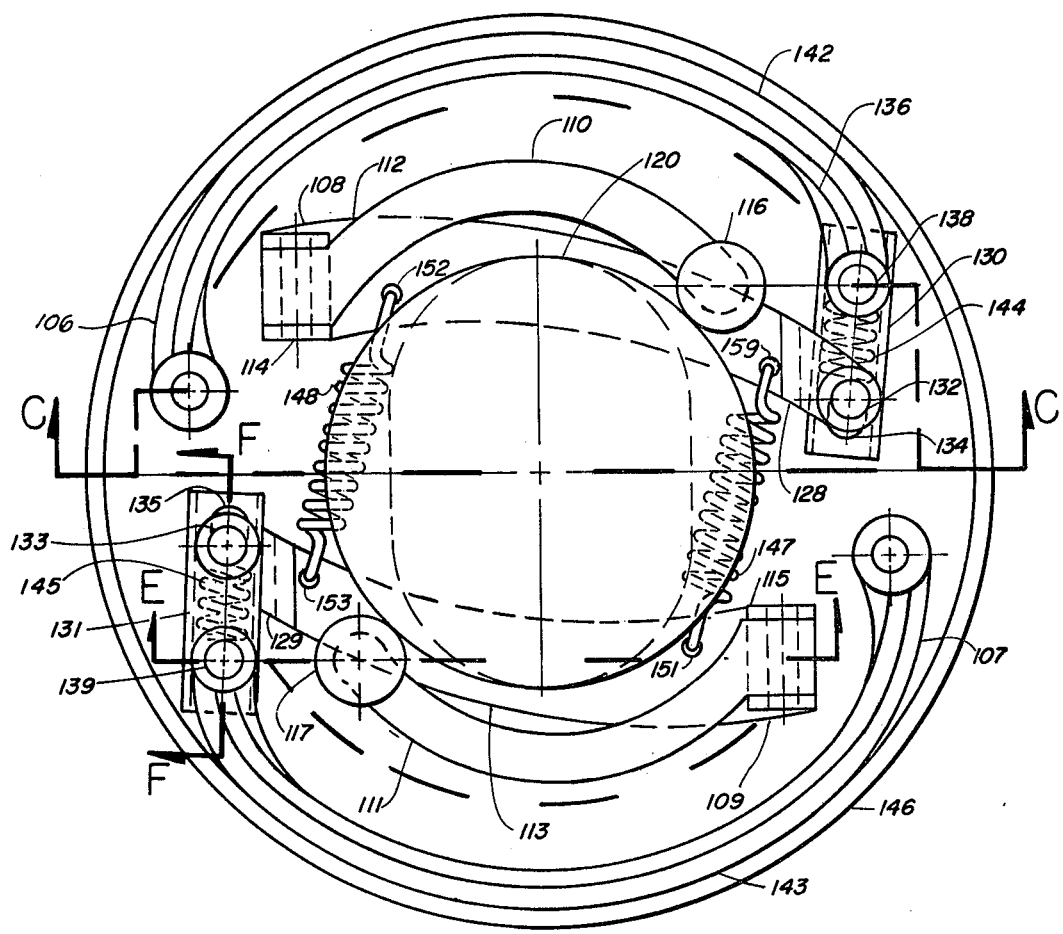

CAM OPERATED FRICTION CLUTCH

BACKGROUND OF THE INVENTION

The present invention provides an externally engagable clutch which has certain distinct advantages over prior art clutches of a similar nature. The present clutch provides an efficacious clutch that is inexpensive to manufacture, very durable, maintenance free, quick acting, and the like which can be employed in an extremely wide variety of applications, for example, in vehicles, portable power plants, or the like. The present clutch device is expecially suitable for use in small vehicular applications, such as in a motor scooter, golf cart, etc.

Inexpensive externally engagable prior art clutches are characterized by a relatively slow acting action, especially in the process of clutching and declutching. This low performance factor also results in poor acceleration whereby an operator in turn will place greater stress upon the power plant in order to upgrade the performance of the vehicle on which the clutch is mounted. Prior art attempts to rectify this problem have generally resulted in providing much more expensive and sophisticated clutch mechanisms which not only increases the cost of manufacture, but additionally results in higher maintenance expenses. The thrust of the prior art has been away from the use of clutch shoe type of clutches due to their high heat load factor caused by the extent of slippage that is characteristic of such prior art types of clutches. Among the distinct features and advantages of the present invention is the provision of a clutch shoe type of clutch device which is not only inexpensive to manufacture, as well as easy and inexpensive to maintain, but additionally, results in very low slippage whereby it is rendered very attractive for applications heretofore allocated to the use of disc types of clutches. The present clutch is also easily assembled and installed, and additionally, includes certain design features whereby it readily compensates for wear of the clutch linings.

The clutch of the instant invention is engaged and disengaged by forces which are not relative to the clutching forces unlike the design of centrifugal clutches as disclosed in U.S. Pat. Nos. 3,224,251 and 2,301,849 wherein the greater the work force is, then the greater the force required to engage and disengage the clutch.

The above objects and unique advantages of the instant invention will be apparent in light of the ensuing detailed disclosure of it preferred embodiments and as more particularly pointed out in the appended claims.

BRIEF DESCRIPTION OF THE DRAWINGS

In the three sheets of drawings illustrating the preferred embodiments of the present invention, synonomous reference numerals are employed in the various views to refer to identical components.

FIG. 8 in the drawings represents a side elevational view of the same preferred embodiment illustrated in FIG. 7 taken along the offset sectional line D—D of that figure.

FIG. 9 represents a broken away partial sectional view taken along the split sectional line E—E of FIG. 8.

FIG. 10 is an isolated schematic arrangement of the cam means of the preferred embodiment of FIG. 8.

FIG. 11 in the drawings represents a partial sectional view taken along the limited sectional line F—F of FIG. 8 showing certain details of the spring loaded sleeve member connecting the eccentric arm assembly and clutch assembly.

DESCRIPTION OF THE PREFERRED EMBODIMENT

Figure 1:
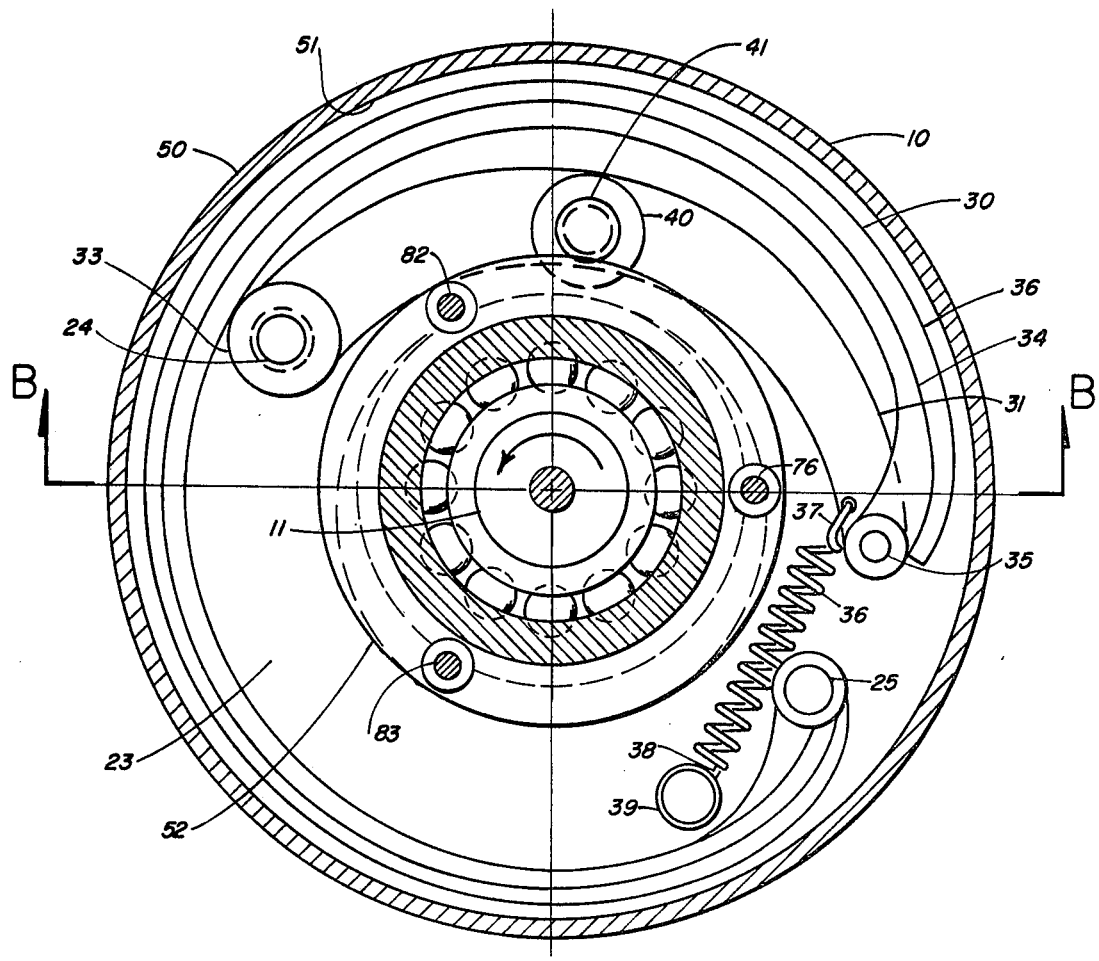
FIG. 1 in the drawings depicts a side elevational view of the present clutch taken along the offset sectional line A—A of FIG. 2.
Figure 2:
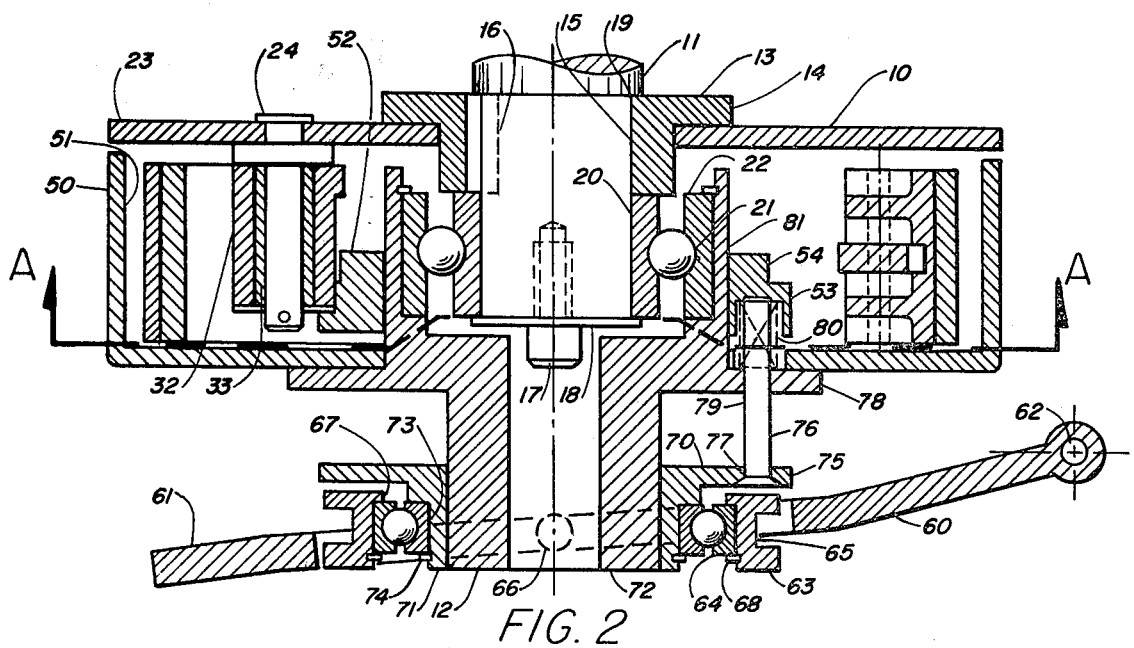
FIG. 2 in the drawings illustrates a cross sectional view of the embodiment of FIG. 1 taken along the center sectional line B—B of FIG. 1.

Referring to FIGS. 1 and 2 in the drawings, which depicts a preferred rudimentary embodiment of the present invention, the present clutch 10 will be described with regard to the shaft 11 being the driving shaft which is connected to some form of a prime mover, for example, an internal combustion engine. The present clutch means in turn allows the rotary motion of the shaft 11 to be imparted to the outer rotating driven clutch drum hub assembly 12 as described in detail below. This relationship can be reversed.

The rotary power of the prime mover shaft 11 is imparted to the present clutch through the rotating hub 13 which is a cylindrical shaped member provided with the radial flange portion 14 and the collar portion 15 which is bored to receive the end of the shaft 11. The rotating driving hub 13 in turn is operably attached to the shaft 11 in some suitable form or fashion so as to prevent it from slipping upon the peripheral surface of the shaft 11 to ensure full power transmission from the shaft 11 to the hub 13, for example, by way of the key 16 in the manner well known in the art. The rotating driven hub 13 is further affixed to the shaft 11 by virtue of the cap screw 17 and retaining washer 18 assembly which prevents it from lateral shifting. This is accomplished by virtue of the retaining washer 18 which holds the rotating hub 13 in confinement against the shoulder 19 defined on the shaft 11 which has been narrowed or under-cut on its terminal end to a clearance diameter of that of the bore hole of the rotating hub 13. The roller bearing means, as described in detail hereinafter, is also held in a lateral position upon the terminal end of the shaft 11 by the retaining washer 18 which jams it in juxtaposition with that of the rotating hub 13 by virtue of the cap screw means 17 which holds the retaining washer 18 in abutment with the end of the shaft 11. Other suitable methods of attaching these members to the terminal end of the shaft 11 can be employed, for example, such as by fixing the hub 13 to the shaft 11 by a splined connection and pressing the bearing 20 thereover, or the like.

The driven hub 13 in turn is rigidly affixed to the rotating back plate 23 whereby the latter member is caused to rotate with the shaft 11. The internal clutch assembly 30 in turn is rigidly affixed to the back plate 23 by virtue of the anchor or fulcrum pin 24.

The internal clutch assembly 30 further comprises the eccentric arm 31 which is pivotly connected to the back plate 23 by virtue of the anchor pin 24. The eccentric arm 31 is provided with the enlarged collar portion 32 which is in turn bored to receive the portion 33 which is made of a material having a low co-efficient of friction to reduce friction between the members since the eccentric arm 31 is constantly pivoted around the anchor pin 24 in the mode of operation as described in detail below. The eccentric arm 31 is arcuate in shape so as to allow it to be nestled between the peripheral surfaces of the rotating shaft and hub assemblies and the underside of the clutch shoe. The opposite curvalinear end of the eccentric arm 31 is pivotly connected to the clutch shoe 34 by virtue of the pin member 35. By such relationship, the eccentric arm 31 and the clutch shoe 34 are allowed to pivot relative to each other about the longitudinal axis of the connecting pin member 35. The clutch shoe 34 has a T shaped cross section and is fully circular in shape, spanning essentially 360° so as to maximize the amount of frictional contact between the friction clutch lining 36 and inside peripheral surface 51 of the outer drum portion 50 of the clutch drum assembly 12. The clutch drum assembly 12 is generally made of steel or cast iron and the clutch lining 36 composed of a hard compressed fiber or similar material either bonded or riveted to the clutch lining support member 34.

The clutch lining shoe 34 is anchored to the back of plate 23 by virtue of the anchor or fulcrum pin 25 around which the shoe and clutch lining assembly is caused to pivot in the process of clutching or declutching whereby the clutch lining 36 moves into and out of contact with the inner peripheral surface 51 of the drum portion 50 in the manner described below. The clutch shoe anchor pin 25 is rigidly affixed to the back up plate 23 in a similar fashion as the pin 24.

The shoe and clutch lining assembly 30 when not engaged is maintained in a compressed position by virtue of the action of the tension eccentric spring 36, its end 37 being operably affixed to the free end or floating end of the eccentric arm 31 where it is pivotly connected to the shoe member 34 by virtue of the pin 35, e.g., by hooking the end 37 of the tension spring 36 and latching it through an aperture bored in the eccentric arm 31. The opposite end 38 of the tension spring 36 is rigidly affixed to the spring anchor pin 39 which in turn is rigidly affixed to the back up plate 23. In such fashion, the tension eccentric spring 36 constantly urges the circular shoe and lining assembly 30 inwards and away from the inner peripheral surface 51 of the drum portion 50 for the primary purpose of declutching the present clutch. However, the movement is also sufficient to prevent any dragging or hanging up between these members in a declutched position so as to avoid excessive wear between the members when the device being driven by way of the clutch is in an idling state.

The eccentric arm 31 is provided with the cam follower 40 which is rotatably mounted upon the eccentric arm 31 by virtue of the pin 41 which in turn is rigidly affixed to the eccentric arm 31. The eccentric arm 31 is caused to move arcuately inwardly and outwardly in a radial plane, pivoting about the anchor pin 24 by virtue of a displacement force applied to the cam follower which in turn causes the clutch shoe and lining assembly 30 to expand into frictional contact with the clutch drum 50 whereby the prime mover source and the driven object operably connected to the driven hub 12 is coupled together thereby allowing direct power transmission.

Figure 4:
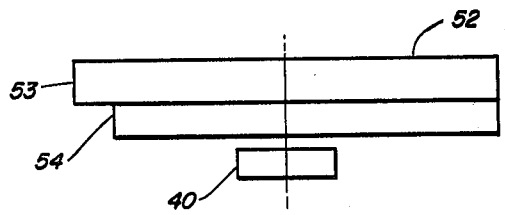
FIG. 4 in the drawings depicts a plan view of the position of the cam and the cam follower shown in FIG. 3.
Figure 6:
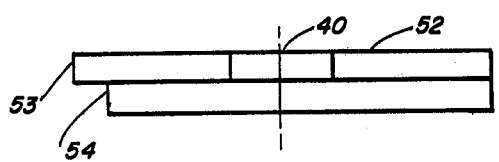
FIG. 6 is similar to FIG. 4, however, depicts a plan view of the position of the members shown in FIG. 5.
Figure 3:
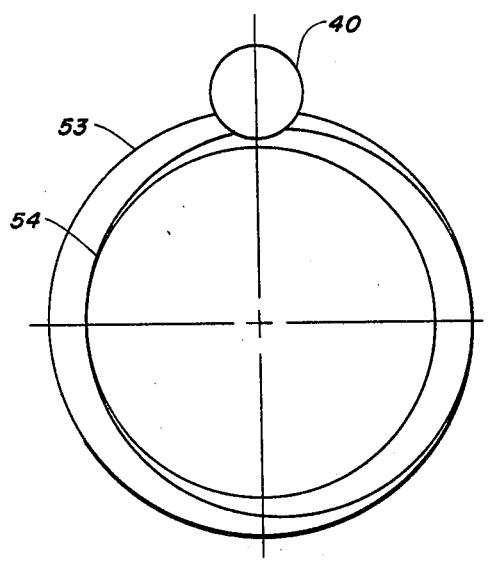
FIG. 3 in the drawings depicts a schematic elevation view of the operational sequence between the clutch cam and the cam follower of one embodiment of the present invention.
Figure 5:
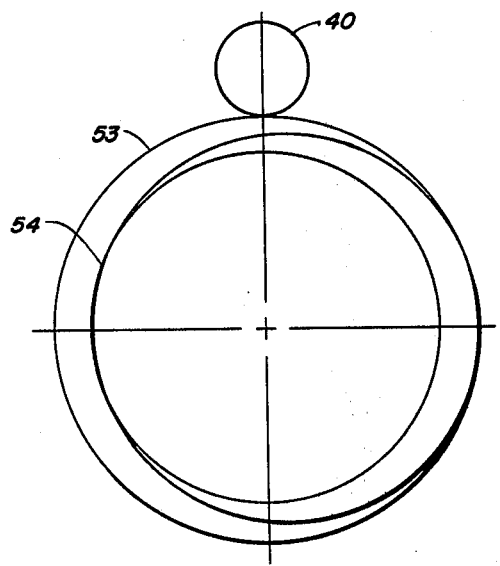
FIG. 5 is similar to FIG. 3, however, showing the displaced position of the cam follower upon engagement of the present clutch.

The above radial expanding action is imparted to the clutch shoe and clutch assembly via the cam follower 40 by virtue of the cam member 52 which in turn is provided with a 2 stepped surface as shown in FIGS. 3 and 4. The first stepped portion 53 of the cam 52 is arranged such that its outer peripheral surface is positioned concentric to the longitudinal axis of the cam 52 which is the same as that of the shaft 11. The second stepped portion 54 of the cam 52 is designed such that its peripheral surface is eccentric with respect to the longitudinal axis of the cam and positioned such that its peripheral surface at one point is tangent to that of the stepped portion 53. By such an arrangement, when the cam follower 40 as shown in FIGS. 3 and 4 is in its initial position upon the portion 54 of the cam 52 and while under a radial force (which originates as described below) it will thereby induce the cam follower 40 to move across the peripheral surface of the cam 52 whereby the cam follower 40 will roll up upon the peripheral surface of the portion 53 at that location where the peripheral surface thereof is flush with that of the portion 53. By virtue of such displacement, the cam follower 40 will thereby be radially displaced over a distance equal to the radial distance of the annulus defined between the portions 53 and 54 of the cam 52. This maximum radial displacement position is that as illustrated in FIGS. 5 and 6 of the drawings and the cam follower upon reaching that position continues to rotate over that cam surface until the clutch shoe and clutch drum does not continue to slip.

Referring to FIG. 2 in the drawings, the present clutch means comprises the clutch throw out assembly 60 which in turn further comprises the yoke member 61 which is pivotly mounted to a fixed support or frame assembly, generally that of the particular device on which the present device is operably mounted. The clutch yoke 61 pivots about the pin 62. The yoke member 61 is adapted to receive the ball bearing spider member 63 which serves as a retainer for the conventional ball bearing assembly 64, the ball bearng spider or collar member 63 being bored to receive the outer race of the ball bearing assembly 64, the clearance between those members being such that the outer race 64 will not rotate within the collar 63. The collar 63 is provided with the groove 65 wherein the yoke pin member 66 bayonets. In the embodiment of FIG. 2, the collar 63 would be pivotedly positioned between two of the yoke pins 66 which would be positioned essentially 180° apart or diametrically opposed to each other. By such an arrangement, pivoting or movement of the yoke 61 along the longitudinal axis of the present clutch would in turn cause the ball bearing assembly 64 and related structure described below to shift with the yoke 61. The collar 63 is also provided with the shouldered portion 67 against which the outer race of the ball bearing assembly 64 abuts to thereby confine the outer race within the collar 63 in conjunction with the ball bearing retaining ring 68. In such fashion, the yoke assembly 60 can be shifted or displaced along the longitudinal axis of the present clutch whereby shifting of the ball bearing assembly 64 within the collar 63 is prevented.

The rotating clutch drum hub assembly 12 further comprises the hub flange 70 which is provided with the collar portion 71 which is bored such that it can be slidably or snugly fit upon the extended collar portion 72 of the rotating drum hub assembly 12. The extended collar portion 71 of the hub flange 70 is provided with the grooved portion 73 that is adapted to receive the inner race of the ball bearing assembly 64 wherein it is confined by virtue of the retaining spring or clip 74. Thus, the lateral motion imparted to the outer race of the ball bearing assembly 64 is correspondingly transferred to the outer rotating hub portion 72 through the hub flange 70 by virtue of its connection to the inner race of the ball bearing assembly 64. By such lateral motion, the present centrifugal clutch assembly is accordingly shifted in the manner described below.

The outer rotating hub flange 70 is further defined as comprising the extended flange portion 75 which in turn is provided with at least one of the extended pin members 76. The pin member 76 is rigidly anchored within the flange portion 75 by virtue of the aperture 77 provided therein and wherein the pin 76 is swaged or braided whereby it is securely anchored in place.

The flanged portion 78 of the drum hub assembly 12 is provided with the aperture 79 which is of a diameter sufficient to receive the pin 76 such that it can readily slide within the aperture 79. The pin 76 is of sufficient length so as to extend within the clutch shoe 50 into the hole or indentation 80 provided in the backside of the cam means 52. The cam means 52 in turn is slidably mounted upon the elongated collar portion 81 of the hub portion 72. This operable relationship allows the cam means 52 to be laterally displaced pursuant to the mode of operation described above with regard to FIGS. 3 through 6, that is, the procedure by which the cam follower 40 is caused to roll up and down the cam surface 53 to thereby radially displace the clutch shoe assembly which in turn is caused to engage the drum member 12 which in turn couples the power source 11 to the outer rotating hub portion 72 which in turn is connected to the driven member.

It is preferred to employ more than one of the cam actuating pins so as to balance the forces transmitted between the throw out lever assembly 61 and the sliding cam member 52. Otherwise, there may be a tendency for the pin 76, in the case of employing a single pin, to bend and thereby possibly become jammed within the aperture 79 in which the pin slides through the flange portion 78 of the hub portion 72. Moreover, a single pin would tend to impart a turning motion to the cam 52 thereby perhaps hindering its lateral displacement over the outer peripheral surface of the collar portion 81 of the hub portion 72. Accordingly, as shown in FIG. 1, it is preferred to employ at least two of the pin members 76, either more preferably, the three pin members 76, 82, and 83. By such arrangement, the lateral shifting force applied by the throw out lever assembly 60 is uniformly transmitted to the hub flange 70, pin 76, 82, and 83, and ultimately to the cam member 52. This will prevent any chattering or bonding between those members.

Figure 7:
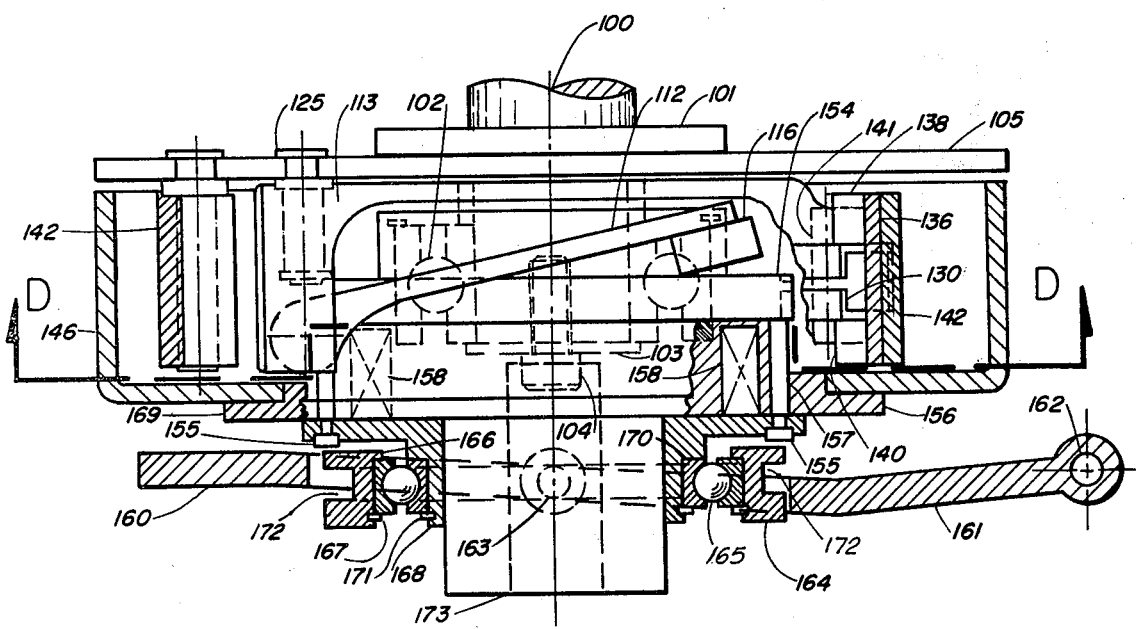
FIG. 7 in the drawing depicts a partial sectional view of another preferred embodiment of the present invention taken along the split center sectional line C—C of the view shown in FIG. 8.

FIGS. 7 through 11 in the drawings depict another preferred embodiment of the present invention wherein the cam member that actuates the clutch shoe assembly is held in a fixed or lateral position and the cam follower that is operably connected to the clutch shoe assembly is allowed to move laterally over the surface of the cam. More specifically as shown in FIG. 7, assuming the shaft 100 is coupled to a source of power, power is transmitted to the present clutch through the inner rotating hub 101, the shaft 100 being undercut to receive the hub 101 and the ball bearing assembly 102. Those members in turn are retained on the end of the shaft 100 and prevented from lateral movement by virtue of the retaining washer 103 and capscrew 104 assembly in a fashion similar to that as described supra with regard to FIG. 2. Other well known means of operably affixing these members to the end of the shaft 100 could be employed.

The driven hub 101 in turn is rigidly affixed to the rotating backplate 105 whereby the latter member is caused to also rotate with the shaft 100.

Referring additionally to FIG. 8, the present embodiment comprises two clutch shoes and clutch assemblies, specifically, the upper clutch assembly 106 and the lower clutch assembly 107. The clutch shoe and clutch assemblies 106 and 107 further comprise the eccentric arm assemblies 108 and 109. The eccentric arm assemblies further comprise the curvilinear shaped cam follower arms 110 and 111, respectively. The members 110 and 111 are in turn pivotly connected to the clutch shoe connecting links 112 and 113 by virtue of the pin members 114 and 115, the ends of those members, for example, the connecting length 112 and cam follower length 110, being formed at their connecting ends to define a hinge assembly pivotly connected to each other by virtue of the connecting pin means 114.

The cam follower means 116 and 117 are rotatably mounted upon the free end of the cam follower arms 110 and 111, respectively, by suitable pin means (not shown). In fact, the cam follower means 116 and 117 can comprise conventional rolling bearing means having an inner race which is rigidly affixed to the free ends 110 and 111. Such structure would minimize the extent of wear between those members since the cam followers 116 and 117 roll from cam surface 122 and 120 to cam surface 121 upon engagement of the clutch. The structural relationship between the various components of the eccentric arm assemblies 108 and 109 are shown in further detail in FIG. 9 which represents a plan view taken in partial section of the lower eccentric arm assembly 109. As shown in FIG. 9, the cam follower arm 111 is pivotably connected to the clutch shoe connecting link 113 by virtue of the pin member 115. The end of the connecting link 113 that is pivotly connected to the cam follower arm 111 by virtue of the pin 115 is shown partially cut away such that only the lower trunnion 123 is shown. The lower trunnion 123 together with a similar portion positioned on the top of the cam follower arm 111 forms a gudgeon or hinge assembly whereby the members 111 and 113 reciprocate relative to each other about the pin 115.

As shown in FIG. 10, the cam member 120 is provided with a two stepped surface, namely the surface 121 which is a circular surface that is concentric with the shaft 100, and the somewhat elliptical surface 122. The major axis of the elliptical surface 122 is of the same dimension as that of the diameter of the circular surface 121 whereby the opposite high spots or portions of the surface 121 are tangent to the circular surface 121 where the point contact of those surfaces coincide. Accordingly, the extent of radial displacement of the cam followers, for example the cam follower 116 as shown in FIG. 10, is thus defined as one half the difference between the minor axis of the elliptical surface 122 and that of the circular surface 121. It can also be appreciated from FIG. 10 taken in conjunction with FIG. 7, that when the cam followers 116 and 117 are in an idling or declutched condition, they are laterally displaced such that no contact between the outer peripheral surface of the cam followers 116 and 117 and the surface of the cam 120 is taking place as the cam 120 is continually rotated. However, as the clutch is engaged in the manner described below, the cam followers 116 and 117 are laterally displaced and upon the cam 120 being rotated into a position such that its minor axis coincides with a common center line defined by a diagonal line drawn through the centers of the cam followers 116 and 117 and that of the shaft 100, the cam followers 116 and 117 are operably positioned diametrically opposed to each other. By such structural arrangement, the cam followers 116 and 117 will simultaneously be laterally displaced onto the elliptical surface 122 of the cam 120. Upon the cam followers being laterally displaced onto surface 122, as the cam 120 rotates, the cam follower lengths 110 and 111 while still under lateral diplacement pressure would then cause the respective cam followers 116 and 117 to roll over and upon the circular surface 121. This action would maintain the clutch shoe assemblies 106 and 107 in a fully extended condition by virtue of the leverage action of the eccentric arm assemblies 108 and 109.

As shown in FIG. 9, the connecting link 113 is pivotly connected to the backplate 105 by virtue of the anchor pin 125, the latter being rigidly affixed to the plate 105. The hinge or gudgeon portion 124 is also provided with the aperture 126 wherein the pin 125 bayonets, the length 113 being retained on the pin 125 by virtue of the keeper 127 which prevents its lateral displacement.

As shown in FIG. 8, the clutch shoe assemblies 106 and 107 are pivotly connected to the eccentric arm assemblies 108 and 109 by virtue of the connecting sleeve portions 128 and 129 which are made integral with the respective connecting lengths 112 and 113. This relationship is shown in greater detail in FIG. 9 which shows the connecting sleeve portions 128 and 129 which are made integral with the respective connecting lengths 112 and 113. FIG. 9 also shows the connecting sleeve 130 as it is operably fitted within the sleeve groove portion 128 of the length 112. The sleeve members 130 and 131 are made of sufficient width such that they slidably, but snugly, fit within the respective grooved portions 128 and 129 of the links 112 and 113. The spring sleeves or links 130 and 131 are provided with an elliptical hole in each of its sides where it is pivotly connected to the links 112 and 113 by virtue of the connecting pins 132 and 133, the bottom most portion of the elliptical holes 134 and 135, respectively, being shown in FIG. 8.

The opposite ends of the sleeves 130 and 131 are pivotly connected to the respective shoes 136 and 137 by virtue of the shoe connecting pins 138 and 139, respectively, the sleeve members 130 and 131 being bored to receive the same. As shown in FIG. 7, the respective spring links 130 and 131 fit within the hinged end portion of their respective shoe members 136 and 137 as shown, for example, in FIG. 7 wherein the sleeve member 130 is hinged between the trunneons 140 and 141.

The elliptical holes 134 and 135 are provided in the ends of the sleeves connectors 130 and 131 so as to provide for wearing away of the clutch shoe liners 142 and 143. The slack between each respective sleeve connector and the sleeve retaining portion of the connecting lengths 112 and 113 is taken out by virtue of the compression springs 144 and 145, respectively. The springs 144 and 145 are high compression springs which are jammed between the respective connecting pins of a given sleeve whereby the pins are constantly urged apart, however, upon the present clutch being engaged, the springs will serve to urge each respective clutch shoe outwards into contact with the inner peripheral surface of the rotating hub 146. In such fashion, as the respective clutch shoe liners 142 and 143 are worn away, the springs 144 and 145 will urge the underlining clutch shoe members 136 and 137 outwards towards the drum 146, the amount of displacement being taken up by the radial displacement provided in the sleeve connectors 130 and 131 by their respective elongated slots, 134 and 135.

The above relationship is more specifically shown in the embodiment of FIG. 11 which is an isolated partial cross sectional view of, for example, the sleeve connector 130. In that view, the spring 144 is shown operable compressed between the pin members 138 and 132, the latter being urged toward the bottom of the elongated slot 134 by virtue of the spring action of the spring 144.

Referring to FIG. 8 in the drawings, the clutch shoe assemblies 106 and 107 are disconnected from the hub 146 upon declutching the present clutch by virtue of the tension springs 147 and 148 which are operably connected in tandem across the ends of the clutch shoe connecting lengths 112 and 113, the spring 147 being hooked on each of its ends for connection to the members 112 and 113 via the apertures 152 and 153 respectively and the spring 148 being hooked on each of its end via the apertures 151 and 159. The manner of laterally displacing the cam followers as shown in FIG. 7 is accomplished by virtue of the lantern ring 154 which is an O shaped ring member operably connected to and suspended upon a series of the shifting pins 155, the flange member 156 forming a part of the rotating drum assembly 146 being provided with the apertures 157 wherein the respective pin members 155 reciprocate laterally. As shown in FIG. 7, the lantern ring 154 is displaced to an extent that the cam follower 116 is in an idling position. In the position shown in FIG. 7, the lantern ring 154 is under the influence of the compression spring means 158 whereby upon pivoting the throw out lever assembly 160 away from the clutch assembly, the pins 155 are allowed to laterally shift together with the lantern ring 154 by virtue of the spring means 158. This action in turn would allow the cam follower connecting links 112 and 113 to shift over due to their natural inclination to assume a position in parallel with the general plane of the present clutch, that is, perpendicular to the longitudinal axis of the shaft 100.

The throw out clutch assembly is further defined as comprising the pivotly mounted yoke member 162 which is pivotly attached to the connecting pin 163 which in turn is operably affixed to some suitable rigid support member, generally, the frame or chassis of the device on which the present clutch is installed. In a similar fashion to the embodiment described above with regard to FIG. 2 of the drawings, the yoke member 161 is provided with the pins or pintles 163, generally two, which bayonet within the grooved ring 164, the latter being provided with the groove 172 wherein the pins fit. The grooved ring or collar in turn is adapted to receive the standard rolling bearing means 165 which is retained within the collar 164 by virtue of the extended lip portion 166 against which the ball bearing 165 is retained by virtue of the standard retaining ring or keeper 167. The ball bearing means 165 in turn is swaged or pressed upon the extended collar portion 168 of the upper flange member 169 which in turn is operably affixed to the hub portion 156 in and through the positioning pins 155 bayonet in the manner described above. The inner race of the ball bearing 165 is confined between the shoulder 170 and the retaining ring 171 to ensure its rotation with the flange hub member 169. By virtue of the ball bearing means 165, the driven hub assembly 173 is allowed to rotate within the throwout lever assembly 160 with minimum frictional losses.

It will be apparent to one skilled in the art that various changes and modifications can be made in the above device as well as in its mode of operation without departing from the true scope of the present invention. For example, the materials of construction can vary widely, that is, they can be made out of various types of different metals, the clutch shoes can be made out of different compositions, and so forth. Moreover, sleeve and bushing assemblies can be employed in lieu of the ball bearing assemblies. Additionally, the exact shape of the various components can be varied considerably, including specifically, the shape and location of the cam means, eccentric means and clutch shoe assemblies. In light of the above, it is thus apparent to one skilled in the art that many modifications can be made in the instant invention and that what I intend to encompass within the ambit of my invention is that as set forth and particularly pointed out in the appended claims.

What I claim as my invention is:

1. An improved externally engagable clutch having cam actuated expandable clutch shoe means for frictional coupling to clutch drum means, wherein the improvement comprises:
   multiple face cam means wherein each cam face contact surface is oriented essentially parallel to the axis of rotation of the clutch and each cam face contact surface is positioned axially adjacent to each other; and
   cam follower means rotatably mounted in a plane essentially perpendicular to the axis of rotation of the clutch and operably connected to the expandable clutch shoe means for expanding it into contact with the clutch drum means, said cam follower means and said multiple face cam means being laterally displaceable relative to each other and the axis of rotation of the clutch.

2. Externally engagable clutch means comprising:
   (a) multiple face cam means having its face contact surfaces oriented in a plane essentially parallel to the axis of rotation of said clutch and having at least one low face and one high face positioned axially adjacent each other; and
   (b) rotatable cam follower means mounted laterally relative to said cam means;
   (c) clutch shoe assembly means comprising at least one clutch shoe means operably attached to said cam follower means which are extended radially outward when said cam follower means is caused to rise up upon the high face of said cam means;
   (d) clutch drum assembly means operably positioned relative to said clutch shoe means for frictionally coupling thereto upon the radial displacement of said clutch shoe means.

3. The clutch means of claim 2 further characterized as comprising:
   said cam follower means is further defined as comprising eccentric arm means operably attached to said clutch shoe means.

4. The clutch means of claim 3 is further characterized as comprising:
   said cam follower means is further defined as comprising cam roller means rotatably mounted on said eccentric arm means, one end of said arm means being pivotably attached to said clutch shoe assembly means and the other end of which is operably attached to said clutch shoe means.

5. The clutch means of claim 4 further characterized in that:
   said cam means is slidably positioned relative to said cam follower means which is pivotally connected to said eccentric arm in a fixed radial plane such that when said cam means is laterally displaced said cam follower actuates said clutch.

6. The clutch means of claim 5 further characterized in that:
   said clutch shoe assembly means is further defined as comprising a back plate portion;
   said clutch shoe means is further defined as comprising a single curvilinear member adapted to be mounted within said clutch drum means in a close spaced apart relationship to its inner peripheral surface, one end of said clutch shoe means being pivotally attached to the back plate portion of said clutch shoe assembly means and its opposite free end being pivotally attached to said eccentric arm means;
   said eccentric arm means is further defined in that it is arcuately shaped, having one of its ends pivotally connected to the back plate portion of said clutch drum means and its other end pivotally connected to the free end of said clutch shoe means, said cam follower means being rotatably mounted upon said eccentric arm means in rolling contact with said cam means;
   said clutch drum assembly means is further defined in that it is provided with a rotating hub portion having an inner extending collar portion and an outer extending hub portion;
   collar means concentrically mounted over the outer extended hub portion of said clutch drum means;
   connector means operably connecting said cam means to said collar means for laterally displacing said cam means;
   said cam means is further defined in that it is adapted to slidably fit over the outer peripheral surface of the inner extending collar portion of said drum means whereby said cam means can be laterally displaced within said drum means; and
   clutch throw out means operably connected to said cam means for laterally displacing said cam means so as to engage and disengage said cam follower means which in turn actuates said eccentric arm means and said clutch shoe means in clutching and declutching the clutch.

7. The clutch means of claim 6 further characterized as comprising:
   said clutch throw-out means is further defined as comprising pivotally mounted clutch yolk means provided with an inside collar member wherein inner collar means is rotatably mounted in a lateral sliding relationship with respect to the outer hub portion of said drum means; and pin means rigidly affixed to said inner sliding collar and adapted for bayoneting within apertures provided within the radial side wall of said drum means and into contact with said cam means for laterally displacing said cam means within said shoe and drum assemblies.

8. The clutch means of claim 3 further characterized in that:

said cam means is positioned in a fixed radial plane and said eccentric arm means is pivotally connected to said clutch shoe means such that it can pivotally move in a lateral direction on and off the multiple faces of said cam means.

9. The clutch means of claim 8 further characterized as comprising:

said clutch shoe assembly means is further defined as comprising a back plate portion;

said clutch shoe means is further defined as comprising two arcuately shaped friction shoe members, one opposite end of each friction shoe member being pivotally connected to the back plate portion of said drum means and the opposite end of each of said shoe members being pivotally connected to said eccentric arm means;

said eccentric arm means is further defined as including two separate shoe actuating assemblies, each comprising a cam follower link, one end of which is operably connected to a cam follower means, its opposite end being pivotally connected to a shoe connecting link whereby said cam follower link is allowed to move radially and laterally, and a spring loaded sleeve connecting means, one end of which is pivotally connected to the opposite end of said shoe connecting link and its other end connected to said adjoining shoe means whereby the radial displacement of said cam follower link in turn expands said shoe means;

said cam means is further defined in that it is provided with a first cylindrical surface and a second elliptical surface, said cam means being rigidly affixed to the inside radial surface of said drum means in an essentially concentric relationship relative thereto said drum means is further defined as being provided with an inner rotating hub portion mounted in rotational alignment with said cam means;

annular lantern ring means concentrically mounted over said cam means in lateral alignment with said cam followers for laterally displacing said cam followers off of the cam faces of said cam means in the process of declutching the present clutch; and clutch throw-out means operably connected to said annular lantern ring for laterally displacing said ring.

10. The clutch means of claim 9 further characterized as comprising:

resilient spring means operably positioned between the hub portion of said drum means and said annular lantern ring so as to constantly urge said lantern ring laterally towards the inner rotating hub portion when said cam followers are maintained in a disengaged idling position; and said clutch throw-out means is further defined as comprising a pivotally mounted yolk member provided with an internal collar member concentrically mounted over the outer rotating hub portion of said drum means in a lateral sliding relationship therewith, and inner sliding collar means having a flanged portion operably connected to said annular lanterm ring by extended pin means which bayonet through the radial wall of said drum means for connection to said lantern ring.

* * * * *